(12) United States Patent
Kashima et al.

(10) Patent No.: US 7,320,314 B2
(45) Date of Patent: Jan. 22, 2008

(54) GENERAL-PURPOSE ENGINE FUEL TANK FUEL VAPOR TREATMENT SYSTEM

(75) Inventors: Souji Kashima, Wako (JP); Katsuya Tajima, Wako (JP); Eiichi Utsugi, Wako (JP); Shosaku Chiba, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/433,480

(22) Filed: May 15, 2006

(65) Prior Publication Data
US 2006/0266338 A1    Nov. 30, 2006

(30) Foreign Application Priority Data
May 24, 2005    (JP)    ............... 2005-150297

(51) Int. Cl.
*F02M 33/02*    (2006.01)
*F02M 33/04*    (2006.01)
(52) U.S. Cl. .................... 123/519; 123/198 D
(58) Field of Classification Search ............. 123/520, 123/519, 518, 516, 198 D; 137/43, 202, 137/587
See application file for complete search history.

(56) References Cited

U.S. PATENT DOCUMENTS 3,961,724 A * 6/1976 Kapsy ............... 220/371
4,696,409 A * 9/1987 Vize ............... 220/203.2
4,884,716 A * 12/1989 Steiner ............... 220/202
5,042,678 A * 8/1991 Munguia ............... 220/254.9
6,193,093 B1 * 2/2001 Brunner ............... 220/234

FOREIGN PATENT DOCUMENTS

| JP | 60-199734 A | 10/1985 |
|---|---|---|
| JP | 63-94154 U | 6/1988 |
| JP | 7-34985 A | 2/1995 |

* cited by examiner

*Primary Examiner*—Mahmoud Gimie
(74) *Attorney, Agent, or Firm*—Arent Fox LLP (57) ABSTRACT

A general-purpose engine fuel tank fuel vapor treatment system includes: a canister mounted on a peripheral part of a fuel filler opening of a fuel tank mounted on a general-purpose engine, the canister housing a fuel adsorbent for adsorbing fuel vapor generated in the interior of the fuel tank; and an air vent provided in a tank cap fitted into the filler opening of the fuel tank. The air vent has an inner end opening in the interior of the fuel tank, and an outer end opening to the atmosphere. The canister is connected to the air vent. The interior of the fuel tank is made open to the atmosphere via the canister and the air vent. Thus, need for special piping is eliminated and fuel vapor within the fuel tank is treated while always stably maintaining the interior of the fuel tank at atmospheric pressure.

14 Claims, 7 Drawing Sheets

GENERAL-PURPOSE ENGINE FUEL TANK FUEL VAPOR TREATMENT SYSTEM

RELATED APPLICATION DATA

The present application is based upon Japanese priority application No. 2005-150297, filed May 24, 2005, which is hereby incorporated in its entirety herein by reference.

BACKGROUND OF THE INVENTION

1. Field of the Invention

The present invention relates to an improvement of a general-purpose engine fuel tank fuel vapor treatment system, the system including a canister mounted on a peripheral part of a fuel filler opening of a fuel tank mounted on a general-purpose engine, the canister housing a fuel adsorbent for adsorbing fuel vapor generated in the interior of the fuel tank.

2. The Related Art

Such a general-purpose engine fuel tank fuel vapor treatment system is already known, as disclosed in, for example, Japanese Patent Application Laid-open No. 7-34985.

In such a conventional general-purpose engine fuel tank fuel vapor treatment system, a canister is formed from part of a tank cap fitted into a fuel filler opening of a fuel tank, an outer end of an air vent of the tank cap is connected to a downstream chamber of an air cleaner of the engine via a pipe, and fuel vapor that cannot be absorbed by a fuel adsorbent within the canister is taken in by the engine.

However, in such a conventional system, it is necessary to provide troublesome piping between the tank cap and the air cleaner; not only does the cost increase, but also the intake negative pressure of the engine acts to some extent on the interior of the fuel tank when the engine is running, and there is therefore a possibility that, due to variation in the intake negative pressure, the characteristics of fuel supply from the fuel tank to the engine might become unstable.

SUMMARY OF THE INVENTION

The present invention has been accomplished under the above-mentioned circumstances, and it is an object thereof to provide a general-purpose engine fuel tank fuel vapor treatment system that eliminates need for special piping and enables treatment of fuel vapor within a fuel tank while always stably maintaining the interior of the fuel tank at atmospheric pressure.

In order to achieve the above object, according to a first feature of the present invention, there is provided a general-purpose engine fuel tank fuel vapor treatment system comprising: a canister mounted on a peripheral part of a fuel filler opening of a fuel tank mounted on a general-purpose engine, the canister housing a fuel adsorbent for adsorbing fuel vapor generated in the interior of the fuel tank, wherein an air vent is provided in a tank cap fitted into the filler opening of the fuel tank, the air vent having an inner end opening in the interior of the fuel tank and an outer end opening to the atmosphere; the canister is connected to the air vent; and the interior of the fuel tank is made open to the atmosphere via the canister and the air vent.

With the first feature of the present invention, since adsorption of fuel vapor onto the fuel adsorbent within the canister and desorption of fuel from the fuel adsorbent are carried out by utilizing breath of the interior of the fuel tank, it is possible to prevent fuel vapor from being released into the atmosphere and also restore the adsorption function of the fuel adsorbent, without providing special piping.

According to a second feature of the present invention, in addition to the first feature, the tank cap is formed from a cap inner part comprising a bottomed cylindrical portion inserted into and latched to the fuel filler opening and a flange portion protruding radially from the upper end of the bottomed cylindrical portion to come into intimate contact with the fuel tank in an area around the fuel filler opening, and a cap outer part fitted onto and fixed to the outer periphery of the flange portion; the canister, which has a T-shaped cross-section corresponding to a vertical cross-sectional shape of the fuel tank, is disposed between the cap inner part and the cap outer part so that the interior of the tank cap is divided into a first vent chamber communicating with the interior of the fuel tank and a second vent chamber communicating with the atmosphere; and the canister is provided with a first communication hole and a second communication hole communicating with the first vent chamber and the second vent chamber, respectively.

With the second feature of the present invention, since a large capacity canister can be arranged by effectively utilizing the space of the tank cap, the interior of the canister can be sufficiently packed with the fuel adsorbent to effectively enhance the fuel adsorption performance, and adsorption of fuel vapor onto the fuel adsorbent within the canister and desorption of fuel from the fuel adsorbent can be effectively carried out by utilizing ventilation via the air vent within the tank cap.

According to a third feature of the present invention, in addition to the second feature, the first communication hole of the canister is disposed so as to open in an upper part of the first vent chamber, and a dividing wall for separating the first and second communication holes is disposed in the interior of the canister.

With the third feature of the present invention, since the distance between the second communication hole and the first communication hole, which are disposed on the inside and the outside of the dividing wall, is made large by the dividing wall, gas passing through the interior of the canister takes a meandering path so that the distance over which the gas is in contact with the fuel adsorbent becomes long, whereby the fuel adsorbent sufficiently exhibits its adsorption function.

According to a fourth feature of the present invention, in addition to the first feature, the canister is mounted on an inner wall of the fuel tank in proximity to the fuel filler opening; and the canister is provided with a first communication hole opening in the interior of the fuel tank and a second communication hole leading to the air vent in the interior of the tank cap fitted into the fuel filler opening.

With the fourth feature of the present invention, when the tank cap is fitted into the fuel filler opening, the interior of the canister is connected to the air vent of the tank cap, so that the tank cap can be made lightweight independently of the canister while enabling adsorption of fuel vapor onto the fuel adsorbent within the canister and desorption of fuel from the fuel adsorbent by utilizing breath within the fuel tank.

According to a fifth feature of the present invention, in addition to the fourth feature, the canister is formed into an annular shape so as to be fitted around an outer peripheral face of the tank cap fitted into the fuel filler opening; and an annular chamber is defined above the canister, the annular chamber surrounding the tank cap and providing communication between the second communication hole and the air vent of the tank cap.

With the fifth feature of the present invention, when the tank cap is fitted into the fuel filler opening, the second communication hole of the canister and the air vent of the tank cap automatically communicate via the annular chamber defined above the canister, so that it is possible to reliably carry out adsorption of fuel vapor onto the fuel adsorbent within the canister and desorption of fuel from the fuel adsorbent by utilizing breath within the fuel tank.

The above-mentioned object, other objects, characteristics, and advantages of the present invention will become apparent from preferred embodiments that will be described in detail below by reference to the attached drawings.

DESCRIPTION OF PREFERRED EMBODIMENTS

A first embodiment of the present invention shown in FIG. 1 to FIG. 5 is explained.

Figure 1:
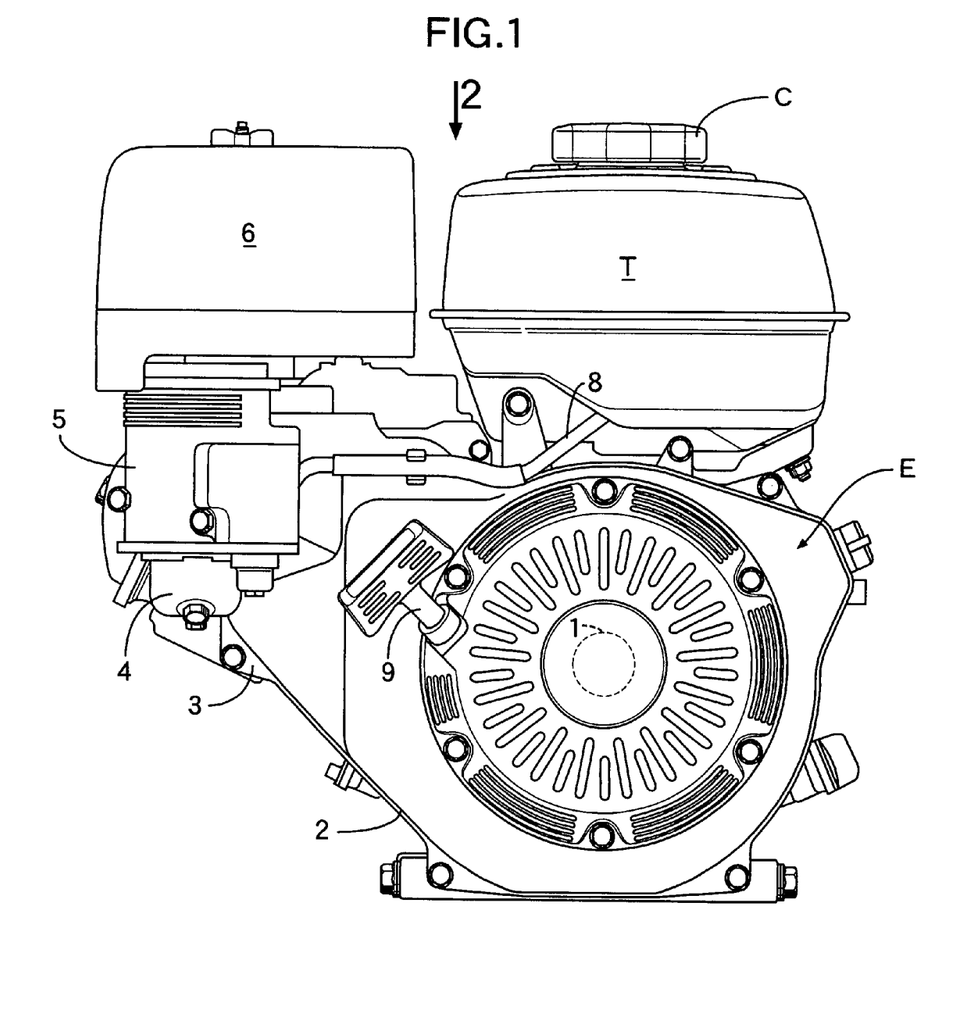
FIG. 1 is a front view of a general-purpose engine related to a first embodiment of the present invention.
Figure 2:
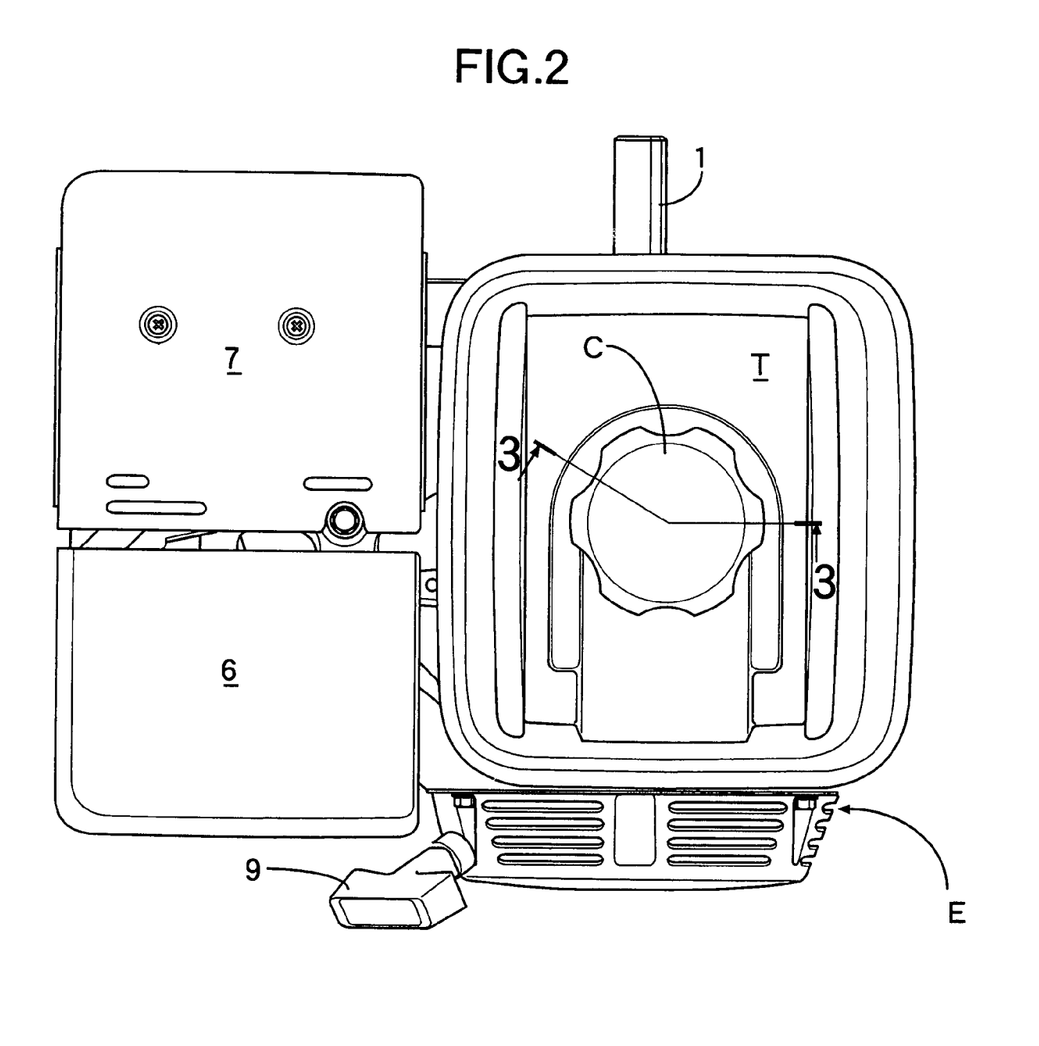
FIG. 2 is a view from arrow 2 in FIG. 1.

Referring to FIG. 1 and FIG. 2, reference symbol E denotes a general-purpose 4-cycle engine which is a power source for various types of work machine. The engine E includes a crankcase 2 supporting a horizontally disposed crankshaft 1, and a cylinder part 3 projecting obliquely upward from the crankcase 2. A fuel tank T is disposed immediately above and supported by the crankcase 2. A carburetor 4 is mounted on one side of the cylinder part 3. An air cleaner 6 connected to the carburetor 4 via an intake duct 5 and an exhaust muffler 7 connected to the other side of the cylinder part 3 are disposed immediately above the cylinder part 3 so as to be arranged side by side next to the fuel tank T. Connected to a base plate of the fuel tank T is a fuel pipeline 8 for feeding fuel within the fuel tank T to the carburetor 4 by gravity. Furthermore, a recoil type starter 9 is provided on one side of the crankcase 2, the recoil type starter 9 being capable of cranking the crankshaft 1.

Figure 4:
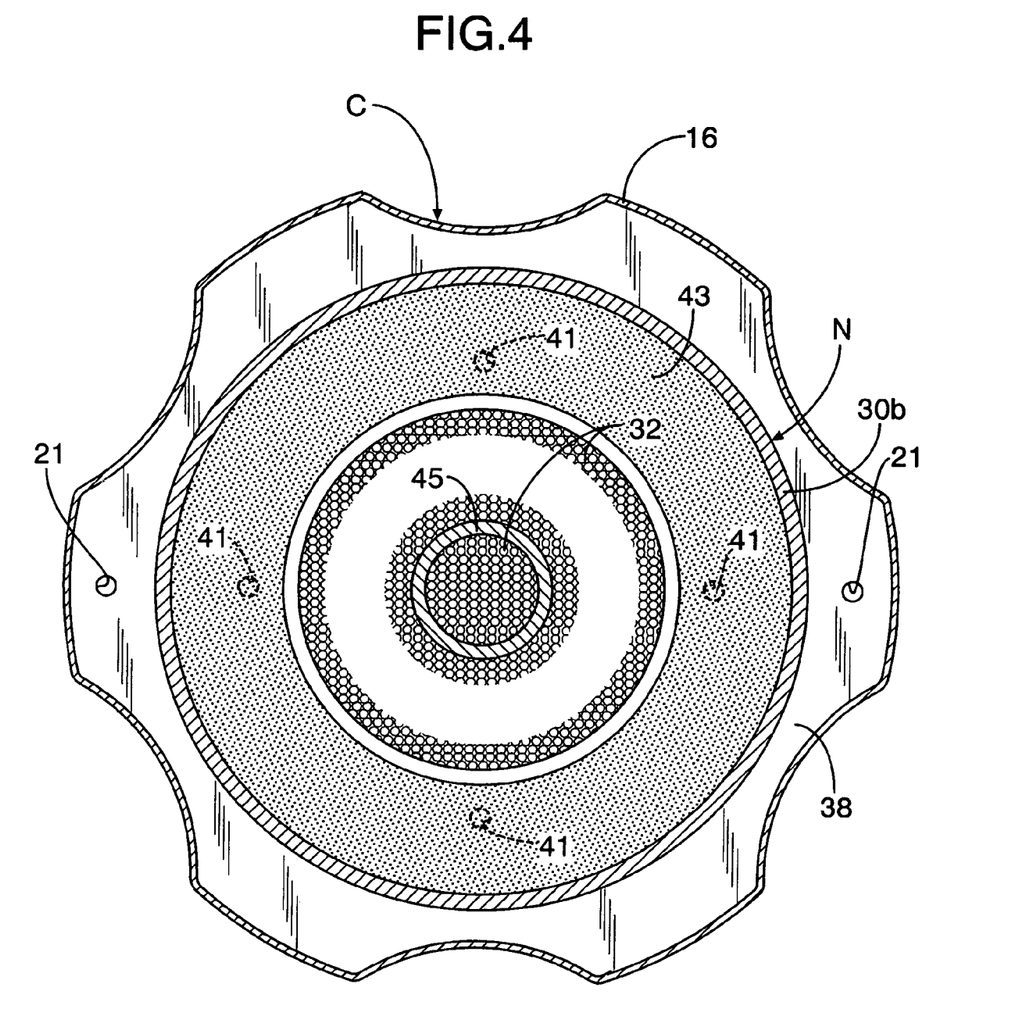
FIG. 4 is a sectional view along line 4-4 in FIG. 3.
Figure 5:
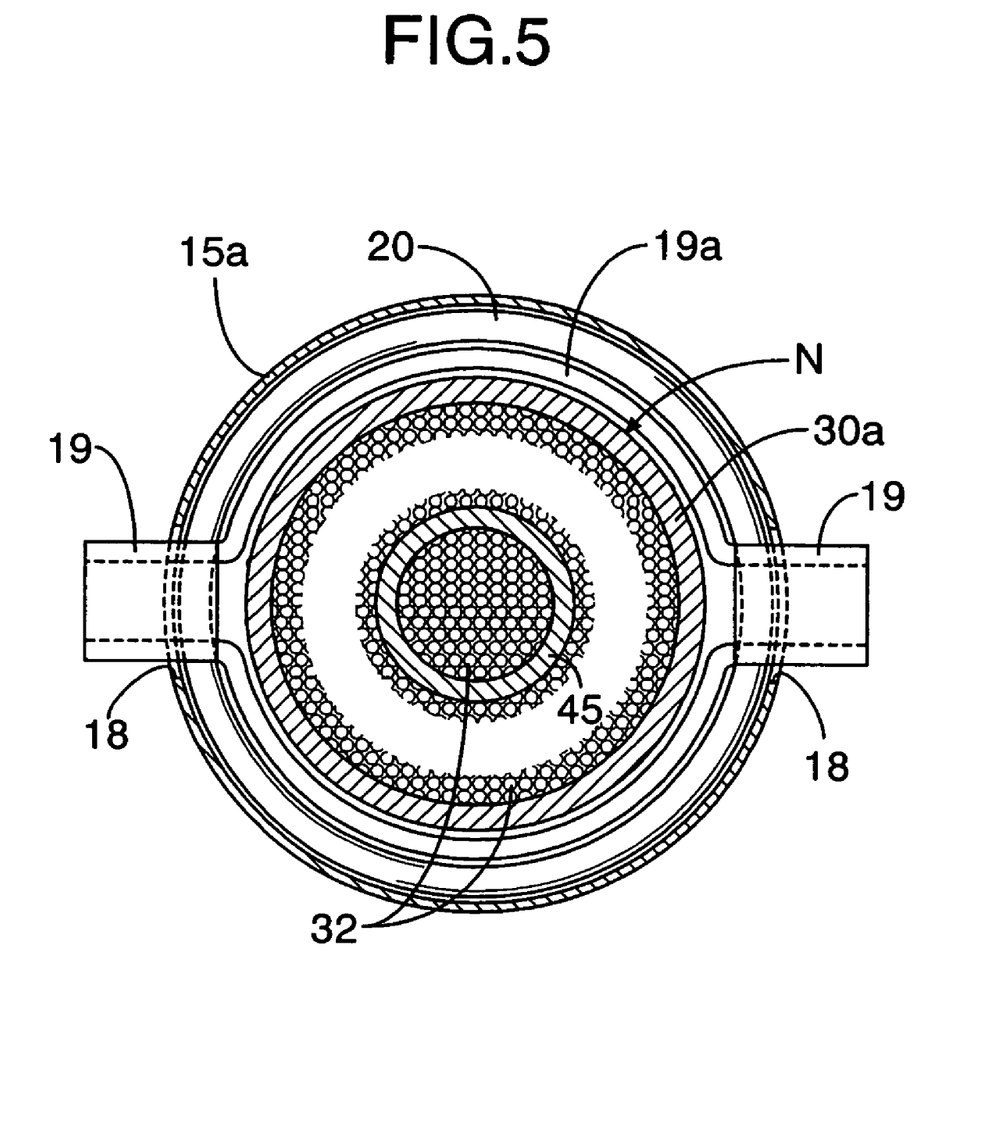
FIG. 5 is a sectional view along line 5-5 in FIG. 3.

An fuel vapor treatment system for the fuel tank T is now described by reference to FIG. 3 to FIG. 5.

A tank cap C is detachably fitted into a fuel filler opening 11 formed in a roof plate 10 of the fuel tank T. This tank cap C includes a cap inner part 15, a cap outer part 16, and a gasket 17. The cap inner part 15 is formed from a bottomed cylindrical portion 15a that can be inserted into the fuel filler opening 11, and a flange portion 15b protruding radially from the upper end of the bottomed cylindrical portion 15a. The cap outer part 16 is fitted onto the outer periphery of the flange portion 15b by crimping. The gasket 17 is fitted around the outer periphery of the bottomed cylindrical portion 15a to come into intimate contact with a lower face of the flange portion 15b. The bottomed cylindrical portion 15a of the cap inner part 15 is provided with a pair of vertically extending first vent holes 18 facing each other. A latching member 19 extending across the bottomed cylindrical portion 15a and having opposite ends projecting outward therefrom engages with the first vent holes 18 in a vertically movable manner, and a retaining spring 20 resiliently pushing upward the latching member 19 is housed within the bottomed cylindrical portion 15a.

The fuel filler opening 11 of the fuel tank T is defined by a cylindrical portion 23 extending vertically downward from the roof plate 10. An annular sealing face 23a is formed at the upper end of the cylindrical portion 23, the gasket 17 making intimate contact with the annular sealing face 23a. Furthermore, a pair of notches 24 and a latching cam 25 connected to the lower end of the notches 24 are formed on the cylindrical portion 23, the notches 24 facing each other and extending vertically. When inserting the latching member 19 into the notches 24 and pivoting the latching member 19 together with the tank cap C, the latching member 19 is retained by a stopper portion of the latching cam 25 due to the resilient force of the retaining spring 20.

A canister N is housed within the tank cap C. This canister N is formed from a canister main body 30 and a cover plate 31. The canister main body 30 is formed by joining a bottomed small diameter cylindrical portion 30a disposed within the cap inner part 15 and a large diameter cylindrical portion 30b having an open upper face and disposed within the cap outer part 16. The cover plate 31 is joined to the upper end of the large diameter cylindrical portion 30b. As a result of this arrangement, the canister N has a large capacity T-shaped cross-section corresponding to the vertical sectional shape of the tank cap C, and the interior of this large capacity canister N is packed with a fuel adsorbent 32 such as activated carbon. The latching member 19 includes an annular portion 19a into which the small diameter cylindrical portion 30a is inserted.

In order to support the canister N, a projection 33 is formed on a base wall of the cap inner part 15, the projection 33 supporting the base face of the canister N, and a projection 34 is formed integrally with the cover plate 31, the projection 34 abutting against the roof of the cap outer part 16.

Furthermore, an annular seal 35 is disposed between the flange portion 15b of the cap inner part 15 and the large diameter cylindrical portion 30b of the canister N. With this seal 35 as a boundary, the interior of the tank cap C is divided by the canister N into a first vent chamber 37 around the small diameter cylindrical portion 30a and a second vent chamber 38 around and above the large diameter cylindrical portion 30b.

In a state in which the tank cap C is fitted into the fuel filler opening 11, the first vent chamber 37 communicates with the interior of the fuel tank T via the first vent holes 18, and the second vent chamber 38 is open to the atmosphere via a plurality of second vent holes 21 provided in the flange portion 15b of the cap inner part 15.

In the canister N, a plurality of first communication holes 41 opening in an upper part of the first vent chamber 37 are provided in a base wall of the large diameter cylindrical portion 30b, and a second communication hole 42 communicating with the second vent chamber 38 is provided in a central part of the cover plate 31. In this arrangement, filters 43 and 44 for preventing the fuel adsorbent 32 from flowing out through the first communication hole 41 and the second communication hole 42 are provided on the inside of the canister N. Furthermore, a cylindrical dividing wall 45 is formed integrally with the cover plate 31, the cylindrical dividing wall 45 surrounding the second communication hole 42 and projecting toward the small diameter cylindrical portion 30a side, thereby greatly increasing the distance between the first communication hole 41 and the second communication hole 42.

The first vent holes 18, the first vent chamber 37, the second vent chamber 38, and the second vent holes 21 thus form a labyrinth-shaped air vent 39, which makes the interior of the fuel tank T open to the atmosphere, and the first vent chamber 37 and the second vent chamber 38 communicate with each other via the interior of the canister N.

Figure 3:
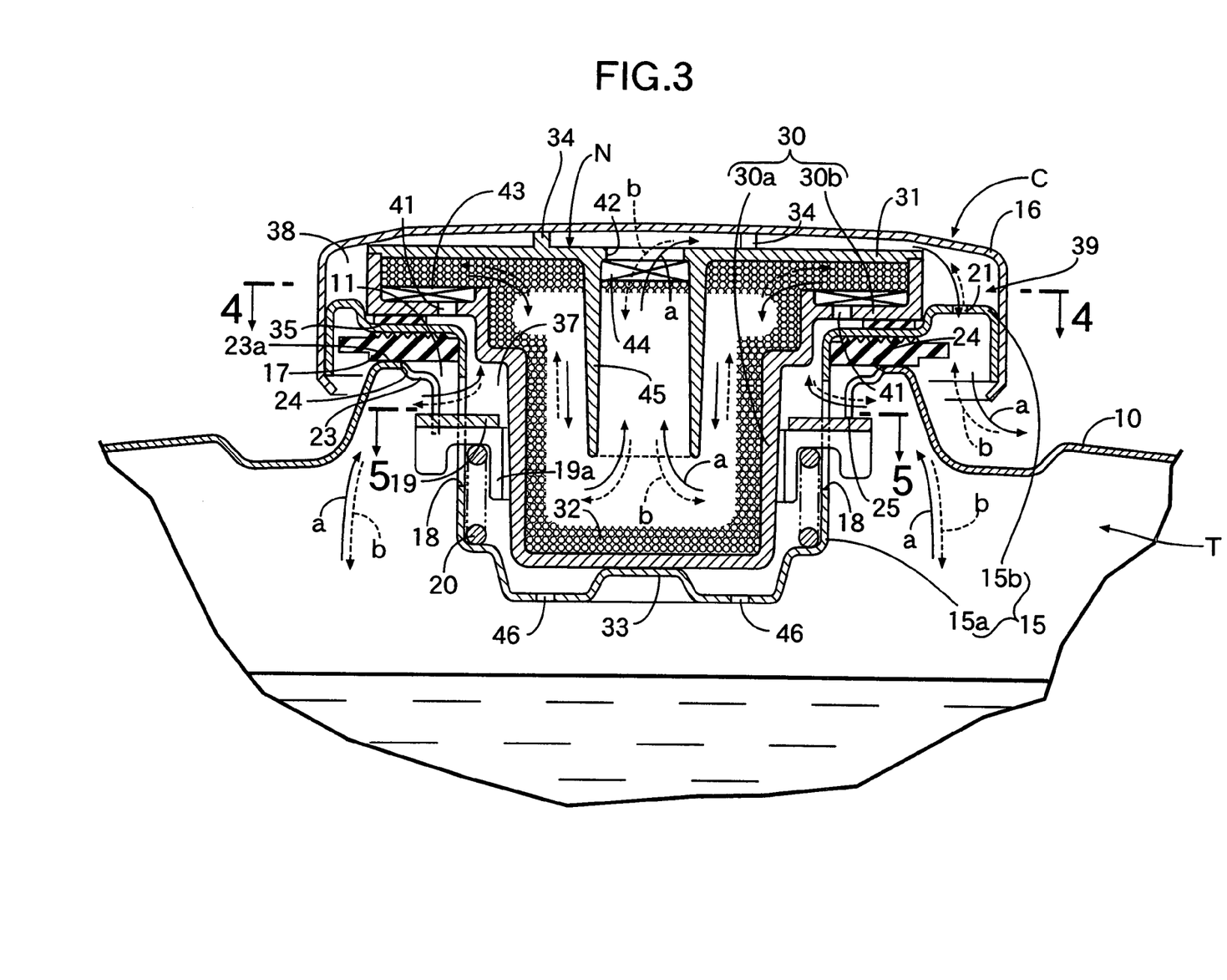
FIG. 3 is an enlarged sectional view along line 3-3 in FIG. 2.

In FIG. 3, reference numeral 46 denotes a discharge hole bored in a base part of the bottomed cylindrical portion 15a in order to return fuel that has built up within the tank cap C to the interior of the fuel tank T.

The operation of the first embodiment is now explained.

When the engine E is running, fuel within the fuel tank T flows down to the carburetor 4 through the fuel pipeline 8, becomes a gas mixture therein, and is supplied to the engine E. Within the fuel tank T, the interior of the tank cap C is always open to the atmosphere via the air vent 39 and the interior of the canister N, so that when the internal pressure of the fuel tank T changes due to fuel issuing from the fuel tank T, heating of the fuel tank T from below by the engine E, etc., the interior of the fuel tank T smoothly carries out breath through the air vent 39 and the interior of the canister N in response to the change, thus maintaining an atmospheric pressure state. It is therefore possible to stabilize the characteristics of fuel supply to the engine E.

Within the fuel tank T, particularly during the above-mentioned heating, fuel vapor is easily generated, and when the fuel vapor thus generated is guided from the interior of the fuel tank T into the interior of the canister N by air discharged as shown by arrows a in FIG. 3, the fuel vapor is adsorbed by the fuel adsorbent 32 packed in the interior of the canister N.

On the other hand, when the pressure of the interior of the fuel tank T decreases due to fuel issuing from the fuel tank T, dissipation of heat of the fuel tank T after the engine E stops running, etc., the fuel tank T takes in outside air through the air vent 39 and the interior of the canister N as shown by arrows b in FIG. 3. Therefore, the fuel adsorbed as above is desorbed from the fuel adsorbent 32 by the outside air passing through the interior of the fuel canister N, thus returning the fuel back to the interior of the fuel tank T.

In this way, by carrying out adsorption of fuel vapor onto the fuel adsorbent 32 within the canister N and desorption of fuel from the fuel adsorbent 32 by utilizing the breath of the interior of the fuel tank T, the fuel vapor can be prevented from escaping into the atmosphere and the adsorption function of the fuel adsorbent 32 can be restored, without providing special piping.

Furthermore, since the canister N is formed so as to have a large capacity T-shaped cross-section corresponding to the vertical cross-sectional shape of the tank cap C, it is possible to sufficiently pack the interior of the canister N with the fuel adsorbent 32, thus effectively enhancing the fuel adsorption performance. Moreover, in this arrangement, since the distance between the second communication hole 42 and the first communication hole 41 disposed on the inside and the outside of the cylindrical dividing wall 45 is greatly increased by forming the dividing wall 45 on the cover plate 31 of the canister N, the cylindrical dividing wall 45 surrounding the second communication hole 42 and projecting toward the small diameter cylindrical portion 30a side, the gas passing through the interior of the canister N takes a meandering path, thus increasing the distance over which it is in contact with the fuel adsorbent 32 and thereby allowing the adsorption function of the fuel adsorbent 32 to be exhibited sufficiently.

A second embodiment of the present invention is now explained by reference to FIG. 6 and FIG. 7.

In the second embodiment, an annular canister N is fixedly provided on an inner face of a roof plate 10 of a fuel tank T so as to be coaxial with a fuel filler opening 11. The canister N is formed from a bottomed annular canister main body 30 having an open upper face, and an annular cover plate 31 joined to the upper face of the canister main body 30. A seal 51 is fitted into an annular channel 50 formed on an inner peripheral face of the canister N. An outer peripheral face of a bottomed cylindrical portion 15a of a tank cap C fitted into the fuel filler opening 11 comes into intimate contact with the seal 51. When the bottomed cylindrical portion 15a is fitted into the seal 51, an annular chamber 52 is defined immediately above the canister N, the annular chamber 52 surrounding a portion of the bottomed cylindrical portion 15a in which first vent holes 18 open.

The interior of the canister N is divided by a pair of dividing walls 53 into a small capacity empty chamber 54 and an arc-shaped large capacity housing chamber 55, the dividing walls 53 being formed integrally with the canister main body 30 and facing each other, and the housing chamber 55 is packed with a fuel adsorbent 32. The empty chamber 54 communicates with the interior of the fuel tank T via a first communication hole 41 in an outer peripheral wall of the empty chamber 54, and also communicates with the housing chamber 55 via through holes 56 of the dividing walls 53. Furthermore, the housing chamber 55 communicates with the annular chamber 52 via a second communication hole 42 in a roof on the side opposite to the empty chamber 54, the first vent holes 18 of the tank cap C opening in the annular chamber 52. Filters 59 and 60 are provided in the housing chamber 55, the filters 59 and 60 preventing the fuel adsorbent 32 from flowing out through the through holes 56 and the second communication hole 42.

Although the tank cap C is basically the same as that of the first embodiment, a dividing wall tube 57 is disposed in the interior thereof instead of the canister N of the first embodiment, the dividing wall tube 57 being fitted into an annular portion 19a of a latching member 19, whereby the interior of the tank cap C is divided into a first vent chamber 37 communicating with the first vent holes 18 and a second vent chamber 38 communicating with second vent holes 21. These vent chambers 37 and 38 communicate with each other via a plurality of through holes 58 in a flange 57a of the dividing wall tube 57. An air vent 39 in the interior of the tank cap C is thus formed into a labyrinth shape.

Since the other components are the same as those of the first embodiment, components corresponding to those of the first embodiment are denoted by the same reference numerals and symbols, and duplication of the explanation is omitted.

Figure 6:
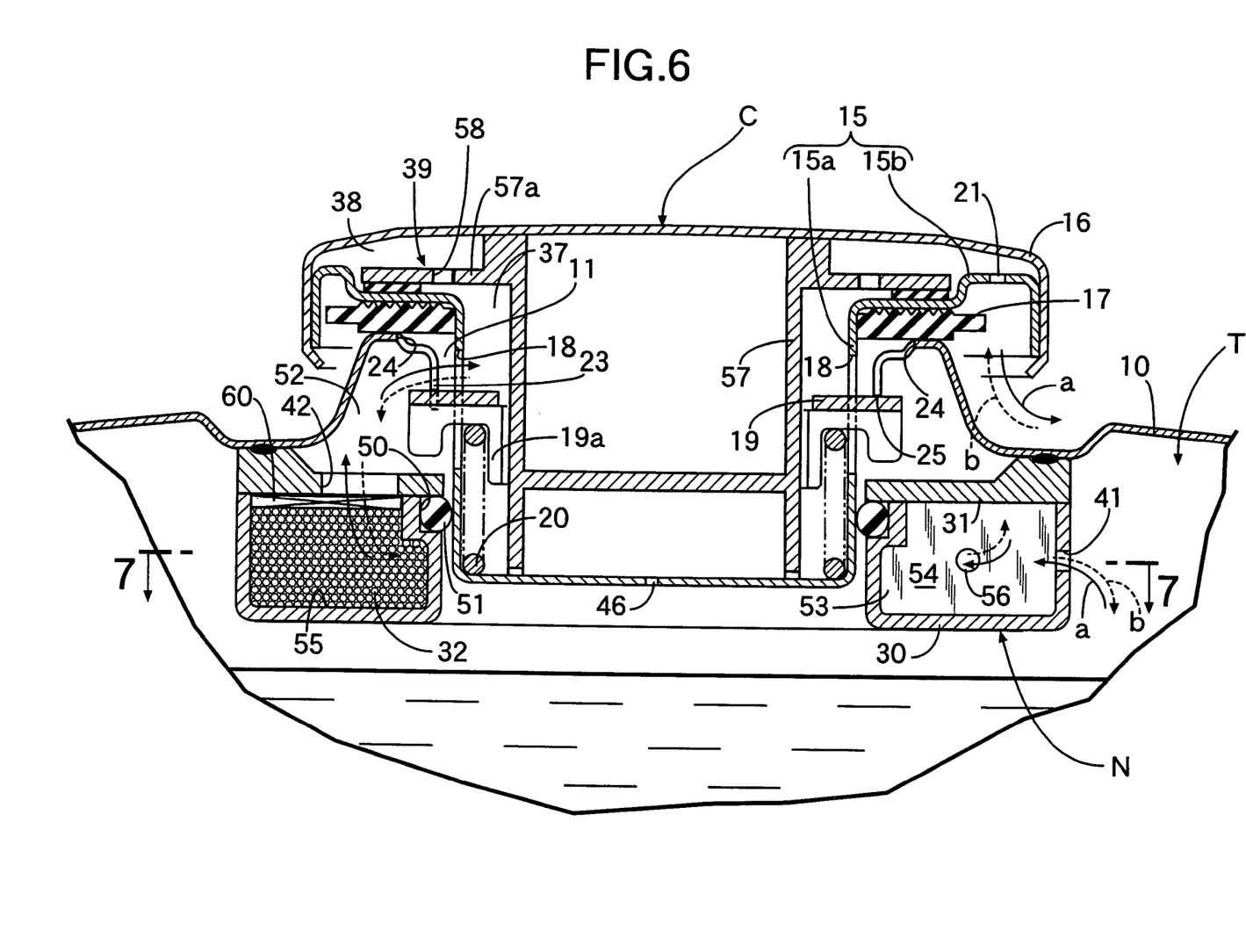
FIG. 6 is a view, corresponding to FIG. 3, of a second embodiment of the present invention.
Figure 7:
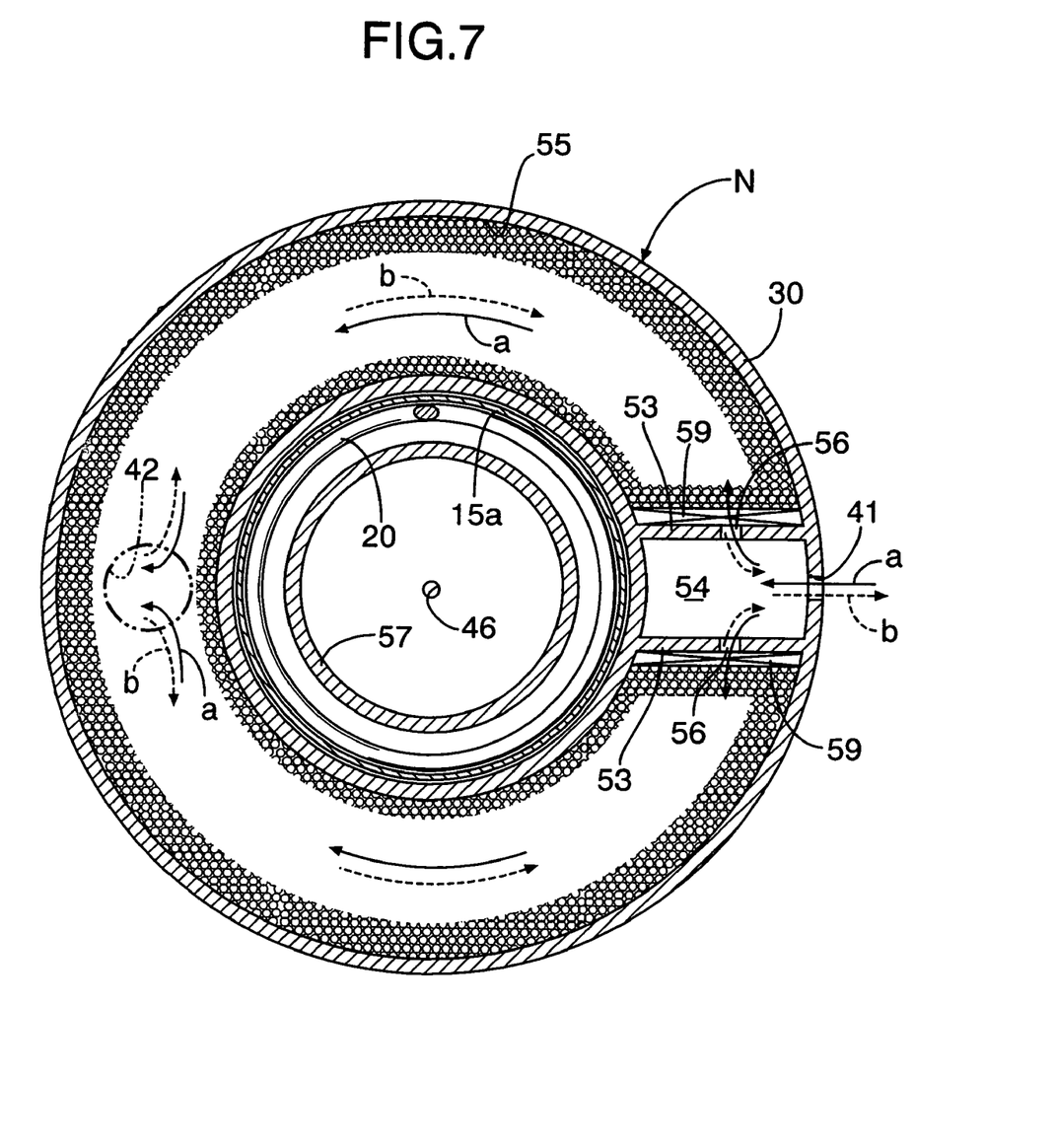
FIG. 7 is a sectional view along line 7-7 in FIG. 6.

When fuel vapor is generated within the fuel tank T, air within the fuel tank T, accompanied by fuel vapor, first flows from the first communication hole 41 of the canister N into the empty chamber 54 as shown by arrows a in FIG. 6, then flows into the pair of through holes 56 and then to the housing chamber 55, and flows throughout the housing chamber 55. Therefore, it is possible to efficiently adsorb the fuel vapor onto the fuel adsorbent 32 that the housing chamber 55 is packed with. Only air flows from the second communication hole 42 into the annular chamber 52, and is then discharged to the atmosphere via the air vent 39 within the tank cap C.

When the pressure of the interior of the fuel tank T decreases, as shown by the arrows, outside air follows the above-mentioned route in reverse and is taken into the interior of the fuel tank T, and in this process the air passing through the housing chamber 55 of the canister N desorb the adsorbed fuel from the fuel adsorbent 32 and return the fuel back to the interior of the fuel tank T.

In this way, also in this second embodiment, by carrying out adsorption of fuel vapor onto the fuel adsorbent 32 within the canister N and desorption of fuel from the fuel adsorbent 32 by utilizing breath within the fuel tank T, the fuel vapor can be prevented from escaping into the atmosphere and the adsorption function of the fuel adsorbent 32 can be restored without providing special piping.

In particular, the canister N is formed into an annular shape so as to be arranged beneath the fuel filler opening 11 and is fixedly provided on the roof plate 10 of the fuel tank T, and when the tank cap C is fitted into the fuel filler opening 11 the outer peripheral face of the bottomed cylindrical portion 15a is fitted into the canister N via the seal 51 so that the interior of the canister N communicates with the air vent 39 of the tank cap C. Therefore, it is possible to form the tank cap C so as to be lightweight independently of the canister N while enabling adsorption of fuel vapor onto the fuel adsorbent 32 within the canister N and desorption of fuel from the fuel adsorbent 32 by utilizing breath within the fuel tank T.

Although embodiments of the present invention have been described above, the present invention is not limited to the above-mentioned embodiments, and can be modified in a variety of ways as long as the modifications do not depart from the spirit and scope of the present invention.

The invention claimed is:

1. A general-purpose engine fuel tank fuel vapor treatment system comprising:
   a canister mounted on a peripheral part of a fuel filler opening of a fuel tank mounted on a general-purpose engine, the canister housing a fuel adsorbent for adsorbing fuel vapor generated in an interior of the fuel tank,
   wherein an air vent is provided in a tank cap fitted into the filler opening of the fuel tank, the air vent having an inner end opening in the interior of the fuel tank and an outer end opening to the atmosphere;
   the canister is connected to the air vent and has a T-shaped cross-section corresponding to a vertical cross-sectional shape of the tank cap; and
   the interior of the fuel tank is made open to the atmosphere via the canister and the air vent.

2. The general-purpose engine fuel tank fuel vapor treatment system according to claim 1, wherein the tank cap is formed from a cap inner part comprising a bottomed cylindrical portion inserted into and latched to the fuel filler opening and a flange portion protruding radially from upper end of the bottomed cylindrical portion to come into intimate contact with the fuel tank in an area around the fuel filler opening, and a cap outer part fitted onto and fixed to an outer periphery of the flange portion; the canister being disposed between the cap inner part and the cap outer part so that an interior of the tank cap is divided into a first vent chamber communicating with the interior of the fuel tank and a second vent chamber communicating with the atmosphere; and the canister is provided with a first communication hole and a second communication hole communicating with the first vent chamber and the second vent chamber, respectively.

3. The general-purpose engine fuel tank fuel vapor treatment system according to claim 2, wherein the first communication hole of the canister is disposed so as to open in an upper part of the first vent chamber, and a dividing wall for separating the first and second communication holes is disposed in the interior of the canister.

4. A general-purpose engine fuel tank fuel vapor treatment system comprising:
   a canister mounted on a peripheral part of a fuel filler opening of a fuel tank mounted on a general-purpose engine, the canister housing a fuel adsorbent for adsorbing fuel vapor generated in an interior of the fuel tank,
   wherein an air vent is provided in a tank cap fitted into the filler opening of the fuel tank, the air vent having an inner end opening in the interior of the fuel tank and an outer end opening to the atmosphere;
   the canister is connected to the air vent; and
   the interior of the fuel tank is made open to the atmosphere via the canister and the air vent,
   wherein the canister is of an annular shape and is mounted on an inner wall of the fuel tank in proximity to the fuel filler opening and surrounds a cylindrical portion of the tank cap, which protrudes into the fuel tank through the fuel filler opening; and
   wherein the canister is provided with a first communication hole opening in the interior of the fuel tank and a second communication hole leading to the air vent in the interior of the tank cap fitted into the fuel filler opening.

5. The general-purpose engine fuel tank fuel vapor treatment system according to claim 4, wherein the canister is fitted around an outer peripheral face of the cylindrical portion of the tank cap fitted into the fuel filler opening; and an annular chamber is defined above the canister, the annular chamber surrounding the tank cap and providing communication between the second communication hole and the air vent of the tank cap.

6. A general-purpose engine fuel tank fuel vapor treatment system comprising:
   a canister mounted on a peripheral part of a fuel filler opening of a fuel tank mounted on a general-purpose engine, the canister housing a fuel adsorbent for adsorbing fuel vapor generated in an interior of the fuel tank,
   wherein an air vent is provided in a tank cap fitted into the filler opening of the fuel tank, the air vent having an inner end opening in the interior of the fuel tank and an outer end opening to the atmosphere, the interior of the fuel tank opening to the atmosphere via the canister and the air vent, and
   wherein the canister comprises a first communication hole and a second communication hole, which are connected to said air vent and a dividing wall provided inside the canister and extending vertically, the canister being adapted to permit flow of air along a passage inside the canister between the first and second communication holes, said passage inside the canister including a portion in which air flows upwardly along the wall and another portion in which air flows downwardly along the wall.

7. The general-purpose engine fuel tank fuel vapor treatment system according to claim 6, wherein said first communication hole is formed at an upper portion of the canister.

8. The general-purpose engine fuel tank fuel vapor treatment system according to claim 6, wherein the tank cap is formed from a cap inner part comprising a bottomed cylindrical portion inserted into and latched to the fuel filler opening and a flange portion protruding radially from an upper end of the bottomed cylindrical portion to come into intimate contact with the fuel tank in an area around the fuel filler opening, and a cap outer part fitted onto and fixed to an outer periphery of the flange portion; the canister, which has a T-shaped cross-section corresponding to a vertical cross-sectional shape of the tank cap, is disposed between the cap inner part and the cap outer part so that an interior of the tank cap is divided into a first vent chamber communicating with the interior of the fuel tank and a second vent chamber communicating with the atmosphere; and said first communication hole and said second communication hole communicate with the first vent chamber and the second vent chamber, respectively.

9. The general-purpose engine fuel tank fuel vapor treatment system according to claim 8, wherein the first communication hole of the canister is disposed so as to open in an upper part of the first vent chamber.

10. A general-purpose engine fuel tank fuel vapor treatment system comprising:
   a canister mounted on a peripheral part of a fuel filler opening of a fuel tank mounted on a general-purpose engine, the canister housing a fuel adsorbent for adsorbing fuel vapor generated in an interior of the fuel tank,
   wherein an air vent is provided in a tank cap fitted into the filler opening of the fuel tank, the air vent having an inner end opening in the interior of the fuel tank and an outer end opening to the atmosphere, the canister being connected to the air vent and the interior of the fuel tank opening to the atmosphere via the canister and the air vent, and
   wherein the canister has a cylindrical portion positioned around the filler opening of the fuel tank, and a latching member for retaining the tank cap onto the fuel tank is mounted on the tank cap so as to be capable of moving inside the inner end of the air vent provided at the tank cap, said cylindrical portion of the canister extending vertically over an area corresponding to the inner end of the air vent.

11. The general-purpose engine fuel tank fuel vapor treatment system according to claim 1, wherein the canister is provided with a communication hole at an upper portion of the canister, the communication hole being connected to the air vent on a side of said inner end.

12. The general-purpose engine fuel tank fuel vapor treatment system according to claim 10, wherein the canister is provided with a communication hole at an upper portion of the canister, said communication hole being connected to the air vent on a side of said inner end.

13. The general-purpose engine fuel tank fuel vapor treatment system according to claim 10, wherein the tank cap is formed from a cap inner part comprising said cylindrical portion of a bottomed shape inserted into and latched to the fuel filler opening and a flange portion protruding radially from an upper end of the bottomed cylindrical portion to come into intimate contact with the fuel tank in an area around the fuel filler opening, and a cap outer part fitted onto and fixed to an outer periphery of the flange portion; the canister, which has a T-shaped cross-section corresponding to a vertical cross-sectional shape of the tank cap, is disposed between the cap inner part and the cap outer part so that an interior of the tank cap is divided into a first vent chamber communicating with the interior of the fuel tank and a second vent chamber communicating with the atmosphere; and the canister is provided with a first communication hole and a second communication hole communicating with the first vent chamber and the second vent chamber, respectively.

14. The general-purpose engine fuel tank fuel vapor treatment system according to claim 13, wherein the first communication hole of the canister is disposed so as to open in an upper part of the first vent chamber, and a dividing wall for separating the first and second communication holes is disposed in the interior of the canister.

* * * * *